Nov. 9, 1926.　　　　　　　　　　　　　　　　1,606,549
F. G. WHITTINGTON
VEHICLE HEATER
Filed Jan. 19, 1924　　　　2 Sheets-Sheet 1
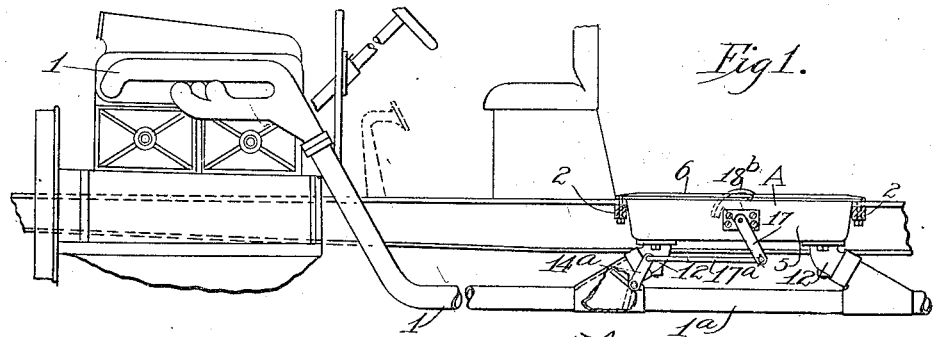
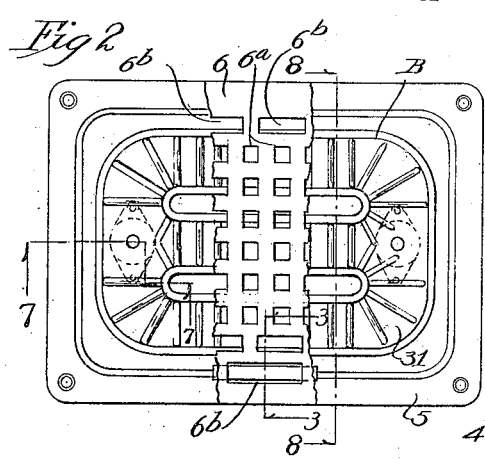
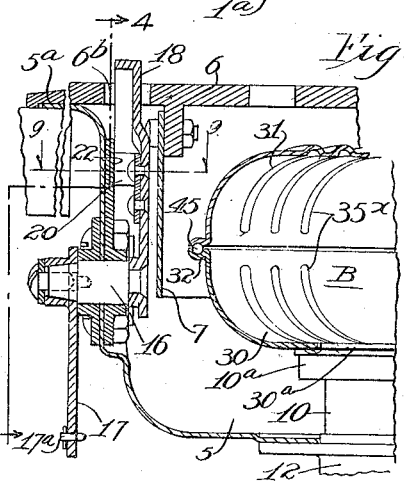
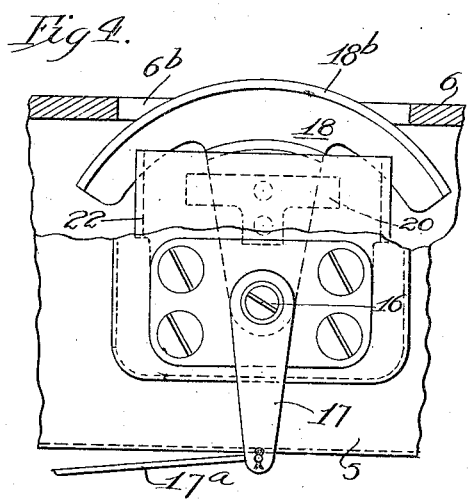
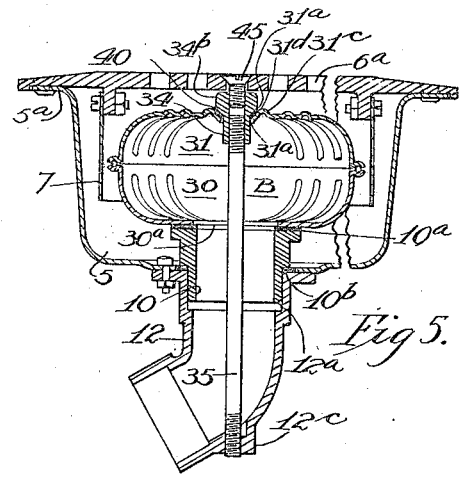
Witness.
N. O. McKnight
Inventor.
Frederik G. Whittington
by Burton Burton
his Attorneys.

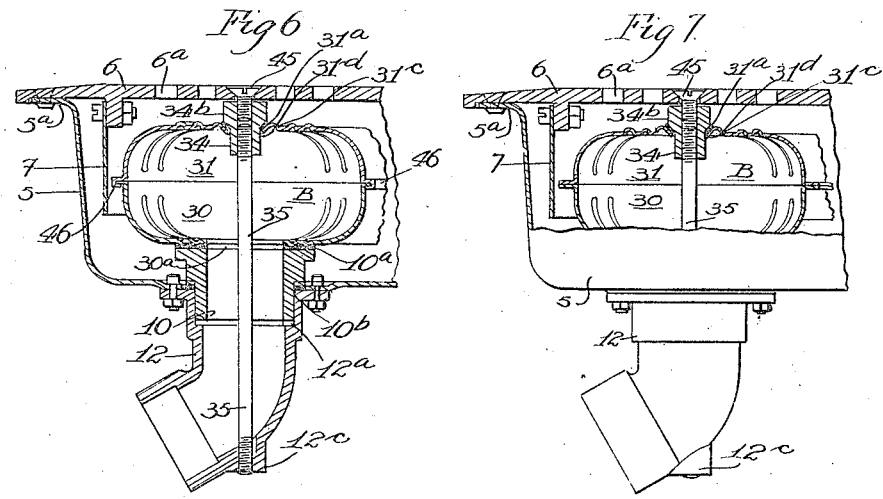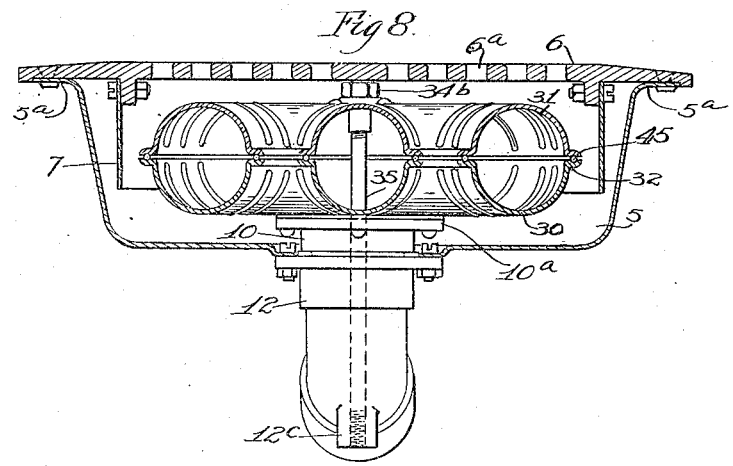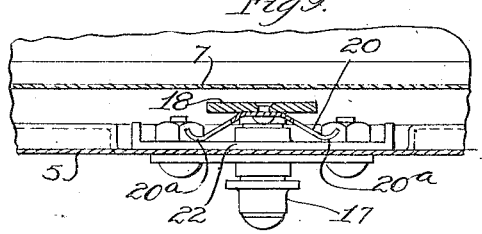

Patented Nov. 9, 1926.

1,606,549

UNITED STATES PATENT OFFICE.

FREDERIK G. WHITTINGTON, OF EVANSTON, ILLINOIS, ASSIGNOR TO STEWART-WARNER SPEEDOMETER CORPORATION, OF CHICAGO, ILLINOIS, A CORPORATION OF VIRGINIA.

VEHICLE HEATER.

Application filed January 19, 1924. Serial No. 687,238.

The purpose of this invention is to provide an improved construction of heaters for the passenger compartments of automobiles and the like, heated from the exhaust gases of the engine, which shall be more economical of construction and more convenient in respect to care thereof and control of the heating fluid than the commonly used devices of this type.

In the drawings:

Figure 1 is a diagrammatic view showing a heater embodying this invention in its position relative to the car and the engine exhaust pipe.

Figure 2 is a plan view of the heater with the floor plate partly broken away for disclosing the heating element below said floor plate.

Figure 3 is a section at the line, 3—3, on Figure 2.

Figure 4 is a section at the line, 4—4, on Figure 3.

Figure 5 is a vertical section of the heating element showing a detail modification in respect to the construction of that element.

Figure 6 is a view similar to Figure 5, showing another detail modification.

Figure 7 in a section at the line, 7—7, on Figure 3.

Figure 8 is a section at the line, 8—8, on Figure 3.

Figure 9 is a section taken on the line 9—9 of Figure 3.

In the drawings the engine exhaust pipe is indicated at 1, leading to the heater, indicated in its entirety by the reference letter A, said heater being shown suspended from the floor, 2, of the compartment of the car to be served by said heater. The heater comprises a pan, 5, suspended from the floor, 2, of a car compartment and enclosing the heating element, indicated in its entirety by by reference letter, B. 6 is the floor plate which constitutes the cover of the pan, 5, and which is lodged upon the upper surface of the floor, 2, lapping at its margin the marginal flange, $5^a$, of the pan, 5, said flange being the means by which the pan is carried suspended by the floor, 2. The floor plate, 6, is reticulated for air circulation, as indicated by the apertures, $6^a$, at the portion of said floor plate which is directly above the heater, B, and apertures, $6^b$, which are marginal with respect to the area under which the pan extends. Between the two areas containing the apertures, $6^a$ and $6^b$, respectively, the floor plate carries depending from its under side a baffle, 7, which extends down in the pan approximately to the plane of the lower side of the heater, and which is spaced from the heater all around the latter a distance adequate for air circulation, as hereinafter explained, the purpose and intent and mode of operation of the construction being that the air will descend through the apertures, $6^b$, and, as compelled by the baffle, 7, will descend to the lower edge of the latter before rising as it will between the baffle and the heater as the air is heated by the latter, the heated air being delivered through the apertures, $6^a$, into the car compartment.

The heating element, B, hereinafter more particularly described, is connected for circulation of the exhaust gases through it, having an intake for said exhaust gases through a nipple, 10, and outlet for the exhaust gases through a similar nipple, 11, said nipples being respectively proximate to the two opposite ends of the heating element. Each of the nipples, 10 and 11, is connected in a manner more specifically hereinafter described with respect to the nipple, 10, with a pipe fitting, 12, of the exhaust pipe line, 1, said fitting being, as is more frequently convenient, and as is illustrated an elbow whose up-turned limb terminating in the fitting, 12, affords the immediate connection with the heater inlet nipple, 10. Suitably located in the exhaust pipe, 1, anterior to the first elbow, 12, is a valve, 14, which controls the flow of the exhaust gases through the exhaust pipe to the heater. The construction of this valve and of the portion of the exhaust pipe in which it is situated, is such as to adapt the valve to direct the exhaust gases either into the exhaust pipe line 1, leading to the heater, or into the by-pass or shunt pipe, 1ª, for by-passing the heater when it is not desired to utilize said gases for heating the car. The construction of this valve and the exhaust pipe fitting in which it is situated for the purposes indicated, is not a part of the present invention, and the construction in this respect, which will be readily understood from the drawing without description, will not be further described here. For operating the valve, 14, there is mounted in the up-standing wall of the pan, 5, a rock shaft, 16, from which a lever arm, 17, extends downward and is connected by a proper linkage, 17ª, with the lever arm, 14ª, of the valve, 14, so that the rocking of the shaft, 16, through a certain angle,—45 to 60 degrees,—will operate the valve, 14, through its entire range from open to closed position. The rock shaft, 16, has a lever arm, 18, extending upward from the rock shaft. As illustrated, and as desirable for certain specific reasons, hereinafter stated, this lever arm, 18, is located inside the pan, 5, and extends up through one of the apertures, 6ᵇ, of the floor plate, so that said lever arm is accessible above the floor plate for actuation by the foot of the occupant for operating the valve, 14, to limit or exclude the exhaust gases from the heater. A desirable form of this lever arm, 18, for the purpose indicated is seen in Figure 4, in which it is represented as having a segment terminal or foot piece, 18ᵇ, protruding through the aperture, 6ᵇ, of the floor plate for frictional engagement by the foot of the operator to rock the shaft, 16, and operate the valve, 14. To prevent this lever from being too easily operated, and thereby liable to be operated by accident for opening or closing the valve, 14, when not desired, the lever arm, 17, has secured to it a friction spring, 20, most clearly seen in Figure 9, whose bowed ends, 20ª, press yieldingly against the mounting plate, 22, which is bolted to the inner side wall of the pan for affording bearing for the rock shaft, 16.

The construction of the heating element, B, and its mounting in the pan, 6, will now be described. This heating element comprises two similar, though not identically formed, dished and marginally flanged members, 30 and 31, having their flanges, 32, which are identical in form, mated for seating one upon the other to enclose the heating fluid chamber made up of the two dished cavities of the two members facing each other. The lower member, 30, has the inlet and outlet apertures, 30ª—30ª at each of which a nipple, 10, is connected for making connection respectively with the inlet and outlet elbows, 12—12, of the exhaust pipe line. These nipples, 10, are flanged at their upper ends at 10ª, for bolting to the margins of the apertures, 30ª—30ª, and are reduced in exterior diameter at a short distance below said flanges to form shoulders, 10ᵇ, for stopping on the upper ends of the elbows, 12, 12, respectively, as seen in Figures 5 and 6. Said elbows are counterbored, as indicated at 12ª, to fit the exterior diameter at the diametrically-reduced portion of the nipples, 10, making a slip-joint pipe connection between said nipples and the respective elbows. The upper member, 31, of the heating element has apertures vertically opposite the apertures, 30ª, 30ª, and, as illustrated, axially aligned with said apertures of the lower member, 30. The margin of these apertures, 31ª, is struck up, as seen at 31ᶜ, for stiffening said margin and affording a sloping seat at 31ᵈ, for the stop shoulder, 34ª, of a fitting, 34, which is in the form of a sleeve with an enlarged hexagonal head, 34ᵇ, and which is axially bored and interiorly threaded as seen in Figure 4. The purpose of this fitting, 34, is to afford engagement for the upper end of a tie bolt, 35, which is screwed into the lower end of said fitting, 34, and extends down through the aperture, 30ª, in the lower member, 30, and through the nipple, 10, and out through the bend of the elbow, 12, which elbow is formed with a boss, 12ᶜ, at its lower side, said boss being bored and threaded to engage the lower threaded end of the tie bolt, 35. Packing, 40, is desirably interposed between the sloping shoulder, 34ᵈ, of the fitting, 34, and the correspondingly sloping margin, 31ᶜ, of the aperture, 31ª, and between the flange, 10ª, of the nipple, 10, and the lower side of the lower member, 30, of the heating element and between the shoulder, 10ᵇ, and the upper end of the elbow, 12. With this construction it will be understood that, the parts being assembled in proper relation, the fitting, 34, being operated as a nut for screwing it onto the upper end of the tie bolt, 35, will cause all the packed joints to be clamped together by one operation, thereby tying the entire heater and each of its parts, viz; pan and heating element, to the elbow, 12, of the exhaust pipe line. A desirable construction of the heating element in respect to the two members, 30 and 31, is shown in Figure 3, consisting in forming the flanges, 32, of each element with a circumferentially-extending corrugation for seating a rope packing, 45. When this construction is adopted and without regard to the specific form of the flanges for accommodating the rope packing, or the form of the packing as being rope, but merely by virtue of the formation of the two heater members with flanges seating one upon the other with packing interposed, the tightening of the fitting, 34, described, will effect secure binding together of the two members, 30, 31, and render the joint at their flanges non-leaking. While this is a desirable feature of the present invention, it may be dispensed with without dispensing with any of the other features described. Instead of securing the joint between the two members of the heating element by he clamping as described, said two members may be permanently united by electric welding, in which case the flanges will be flat or plane faced, as seen in Figure 7. Or the two members of the heating element, being stampings, may be secured together by clinching the margin of the flange of one member over the margin of the flange of the other, as seen at 46, in Figure 6.

The floor plate, 6, is desirably secured to the pan, thereby rendering the entire construction a unit, by means of countersink bolts, 45, taking through suitably countersunk apertures in the floor plate and screwed into the upper ends of the fittings, 34, said fittings being interiorly threaded throughout their length for engaging at the lower end the tie bolt, 35, and at the upper end said countersink bolts, 45. The pan suspended, as stated, by its flanges, 5$^a$, from the compartment floor, 2, is desirably secured to the floor by countersink bolts taking through the pan flange which has its apertures for said bolts stamped to form countersink seats, as seen at 6$^d$, any desired number of such countersink seats being provided at convenient points in the periphery of the pan.

With the construction shown, it is easy to cleanse the pan by unscrewing the two bolts, 45, and removing the floor plate, which gives the operator access to the entire pan which can be wiped clean around and under the heating element, there being no obstructions to interfere. Also the heating element can be readily opened for clearing it of carbon deposit by unscrewing the fitting, 34, which permits the upper member, 31, to be lifted off from the lower, so that both members can be readily cleaned. The construction described also, it will be noticed, permits the removal of the heating element bodily after the removal of the floor plate by merely lifting it from its seat at the slip joint engagement of the nipple, 10, with the upper end of the elbow. These conveniences of assembling and tension are in part purposes of the present invention.

Desirably the members of the heating element are corrugated radially with respect to the tie bolts, 35, and longitudinally between those bolts, forming ridge, 35$^x$, for stiffening said members to prevent them from buckling or being distorted in the clamping effected as described by means of the bolts, 35. The corrugations of the flanges for seating the rope packing serve similarly to stiffen them against distortion.

I claim:—

1. A heater comprising an upwardly opened pan-like chamber adapted to be suspended from the floor of the compartment to be heated; a hollow heating element having opposite top and bottom apertures; a nipple secured at the bottom aperture adapted for slip joint pipe connection; a top fitting for closing the top aperture vertically stopped on the top of the heating element, the pan having a bottom aperture and a pipe member secured thereto having its upper terminal positioned for registering with the nipple and adapted for slip joint pipe connection therewith; means in said pipe member adapted for bolt engagement in line with the top fitting, and a tie bolt engaged with said top fitting and with said means, for tying the pipe member, pan and heating element together vertically.

2. In the construction defined in claim 1, the fitting at the bottom of the pan being secured thereto independently of the slip joint pipe nipple and of the tie bolt.

3. In the construction defined in claim 1, the top fitting having vertically sliding engagement with the top wall of the heating element, and the nipple having direct thrust connection with the bottom wall of said element and with the terminal fitting of the pipe, whereby said junctions are adapted to accommodate yielding packing and to be rendered tight simultaneously by the rotation of the top fitting, operating as a nut, on the tie bolt, clamping all said parts vertically together.

4. In the construction defined in claim 1, the top fitting being interiorly threaded at the upper part to the upper end, and the floor plate being secured by a screw taking through it stopped above it and screwed into said threaded upper end of the top fitting.

5. In the construction defined in claim 1, the heating member comprising two dished and flanged members having their flanges mated for seating one upon the other to constitute of the two members a closed chamber, and packing interposed between the two flanges for making the joint non-leaking.

6. In the construction defined in claim 1, the heating element comprising two dished and flanged members assembled flange to flange with means interposed for rendering the joint between said members non-leaking, whereby the clamping effected by the tie bolt and the threaded sleeve which engages it clamps said joint between the two members of the heating element, said members being ribbed for transmitting the clamping pressure to the flanges.

7. In the construction defined in claim 1, the heating element comprising two dished and flanged members having their flanges mated for seating one upon the other with packing interposed for rendering the joint between them non-leaking, whereby the clamping effected by the tie bolt and its threaded engagement with the sleeve clamps the joint between said flanges, the members of the heating element being radially ribbed to stiffen them for transmitting the clamping pressure to the flanges, the flanges being circumferentially corrugated for stiffening them against distortion by the clamping pressure.

In testimony whereof, I have hereunto set my hand at Chicago, Illinois, this 14 day of January, 1924.

FREDERIK G. WHITTINGTON.